US009026397B2

(12) United States Patent
Tabaru et al.

(10) Patent No.: US 9,026,397 B2
(45) Date of Patent: May 5, 2015

(54) STICK-SLIP DETECTING DEVICE AND DETECTING METHOD

(75) Inventors: Tetsuya Tabaru, Tokyo (JP); Minoru Fukuda, Tokyo (JP)

(73) Assignee: Azbil Corporation, Tokyo (JP)

( * ) Notice: Subject to any disclaimer, the term of this patent is extended or adjusted under 35 U.S.C. 154(b) by 799 days.

(21) Appl. No.: 12/897,154

(22) Filed: Oct. 4, 2010

(65) Prior Publication Data
US 2011/0082665 A1 Apr. 7, 2011

(30) Foreign Application Priority Data

Oct. 5, 2009 (JP) ................. 2009-231328

(51) Int. Cl.
*G06F 15/00* (2006.01)
*G01M 99/00* (2011.01)
*G01M 13/00* (2006.01)
*F16K 37/00* (2006.01)

(52) U.S. Cl.
CPC ........... *G01M 13/00* (2013.01); *F16K 37/0083* (2013.01)

(58) Field of Classification Search
USPC ................. 702/150, 183, 113, 114, 158, 185; 73/1.79, 7, 9, 11.09
See application file for complete search history.

(56) References Cited

U.S. PATENT DOCUMENTS

| | | | |
|---|---|---|---|
| 5,750,879 A * | 5/1998 | Ohtsuka et al. ................... 73/9 |
| 6,382,737 B1 * | 5/2002 | Isono et al. ............... 303/114.1 |
| 7,478,012 B2 * | 1/2009 | Tewes et al. ................... 702/183 |
| 7,872,826 B2 * | 1/2011 | Takeda et al. ................... 360/69 |
| 2006/0168943 A1 | 8/2006 | Schnaibel et al. |

FOREIGN PATENT DOCUMENTS

| | | |
|---|---|---|
| JP | 10-47313 A | 2/1998 |
| JP | 11-190247 A | 7/1999 |
| JP | 2001-055934 A | 2/2001 |
| JP | 2001-342914 A | 12/2001 |
| JP | 3254624 B2 | 2/2002 |

(Continued)

OTHER PUBLICATIONS

Wei Fan et al., "Study on the Stick-Slip Criterion of Unsymmetrical Cylinder Driven by Meter-out Circuit", Proceedings of International Conference on Mechatronics, Kumamoto Japan, May 2007, 5 pp., http://ieeexplore.ieee.org/stamp/stamp.jsp?tp=&arnumber=4279997.*

*Primary Examiner* — Michael Nghiem
*Assistant Examiner* — Alexander Satanovsky
(74) *Attorney, Agent, or Firm* — Troutman Sanders LLP

(57) ABSTRACT

A diagnosing operation controlling portion compares the magnitude of change of a control instruction value that controls the dislocation of a valve stem to a reference value that has been set in advance, and stops the malfunction evaluation operation in a diagnosing portion if the magnitude of change per unit time in the control instruction value exceeds a reference value. If the magnitude of change per unit time in the control instruction value exceeds the reference value, then the evaluation may be the same as for a case wherein a stick-slip has occurred, even if the operation is functioning properly. In contrast, it is possible to prevent incorrect stick-slip evaluations by stopping the operation of the diagnosing portion when the magnitude of change per unit time in the control instruction value exceeds a reference value.

7 Claims, 14 Drawing Sheets

(56) References Cited

FOREIGN PATENT DOCUMENTS

| | | | |
|---|---|---|---|
| JP | 2003-36115 A | 2/2003 |
| JP | 3864525 B2 | 1/2007 |
| JP | 2008-157036 A | 7/2008 |
| JP | 2009-281328 A | 12/2009 |

* cited by examiner

STICK-SLIP DETECTING DEVICE AND DETECTING METHOD

CROSS REFERENCE TO RELATED APPLICATIONS

The present application claims priority under 35 U.S.C. §119 to Japanese Patent Application No. 2009-231328, filed Oct. 5, 2009, which is incorporated herein by reference.

FIELD OF TECHNOLOGY

The present invention relates to a stick-slip detecting device and detecting method for detecting stick-slip in the operation of a device having a sliding surface having a contact friction portion, such as a regulating valve or a gas governor.

BACKGROUND OF THE INVENTION

Failures in regulating valves or gas governors can be diagnosed by detecting the occurrence of stick-slip in a sliding part. Stick-slip occurs due to the state of a piston 1201, a cylinder 1202, and a contact sliding portion 1203, as illustrated in, for example, FIG. 12. For example, this stick-slip occurs when, for example, contamination incurs into the contact sliding portion 1203. Consequently, stick-slip can be detected by monitoring the state of a measured dislocation by measuring the dislocation of the piston 1201. (See Japanese Patent 3254624.)

Here a simple explanation will be given regarding the detection of stick-slip set forth in JP '624. In this detecting technique, the dislocation of the piston 1201 is detected, a first state quantity is calculated from the detected dislocation, a second state quantity is calculated from the detected dislocation, and a relationship between the first state quantity and the second state quantity obtained from the dislocation during proper operation is compared to the relationship between the calculated first state quantity and calculated second state quantity, to detect (evaluate) the stick-slip.

For example, the average of the absolute values of first-order difference values for the dislocation may be used as the first state quantity, and the root mean square of the first-order difference values of the dislocation may be used as the second state quantity. When the dislocations of the piston 1201 are detected discreetly and the ith detected dislocation is defined as $X_i$, then the respective state quantities can be expressed using Equation (1) and Equation (2), below (wherein N is the number of dislocation data used for calculating the state quantities):

Equations 1 and 2

$$\text{(First state quantity)} = \frac{1}{N-1} \sum_{i=1}^{N-1} |X_{i+1} - X_i| \quad (1)$$

$$\text{(Second state quantity)} = \sqrt{\frac{1}{N-1} \sum_{i=1}^{N-1} (X_{i+1} - X_i)^2} \quad (2)$$

The frequency distribution of the absolute values ($|X_{i+1} - X_i|$) of the first-order differences of the dislocation is as illustrated in FIG. 13A and FIG. 13B. FIG. 13A illustrates the state during proper operation, wherein the frequency of occurrence falls smoothly with increasing magnitude of the difference values. On the other hand, if stick-slip occurs, then a majority of the time will be a stationary state, and then slipping will occur occasionally. Because of this, the frequencies of the first-order difference values will have high frequencies clustered around zero, as illustrated in FIG. 13B, (corresponding to the stationary state), with relatively large values at low frequencies (corresponding to the slipping state). In the state wherein this type of stick-slip occurs, the ratio of the first state quantity (the average value of the absolute values of the first-order difference values) to the second state quantity (the root mean square of the first-order difference values) will be larger than during proper operation, making it possible to contact the stick-slip by monitoring the two state quantities.

However, in the technique set forth above, there is a problem in that in some cases there will be an incorrect evaluation that there is a state of stick-slip, due to the state of control of the moving portion (the piston).

In the technique set forth above, the detection is performed through the relationship of two state quantities calculated, from the dislocation of a moving portion, by calculating the motion that is subject to stick-slip detection, divided into a stationary state and a slipping state. This makes the determination using only the dislocation of the moving portion. Because of this, if the movement (dislocation) of the moving portion is similar to that of the stick-slip state, then the evaluation will be that there is stick-slip, even if the stick-slip is not actually occurring. This results in erroneous detection.

For example, in the control of a valve stem position using a positioner, if there is a large change in the valve stem dislocation control instruction value (a setting value or set point), then the behavior of the dislocation of the valve (the moving portion) at the time of the change of the control instruction value may be similar to that of the stick-slip state.

As illustrated in FIG. 14 (*a*), when control instruction values for dislocations wherein the time-series signals form a square wave by alternating two values over time, then the response of the valve stem dislocation for the regulator valve will, accordingly, be measured as the dislocation measurement values for the time-series signals as illustrated in FIG. 14 (*b*). The first-order difference values in this type of dislocation measurement value will be as illustrated in FIG. 14 (*c*). In this case, as illustrated in FIG. 14 (*c*), the majority of the first-order difference values will be clustered near to zero, where only the values immediately after the control instruction value has changed will be large.

This behavior is identical to, the behavior of the stick-slip phenomenon wherein there is a stationary state the majority of the time, with occasional rapid movement in the slipping state. The result is that, in the technique set forth above, there will be incorrect detection of the occurrence of stick-slip when control is performed as illustrated in FIG. 14 (*a*). This incorrect detection tends to occur when the operating speed of the valve is high, and is particularly problematic in small valves.

The present invention is to solve the problem such as set forth above, and the object thereof is to enable the evaluation of the stick-slip state more correctly, in accordance with the state of control.

SUMMARY OF THE INVENTION

The stick-slip detecting device according to the present invention has a diagnosing portion for evaluating a malfunction of the movable portion including dislocation detecting means for detecting a dislocation of a movable portion having a contact sliding portion; first calculating means for calculating a first state quantity from the dislocation; second calculating means for calculating a second state quantity from the dislocation; a characteristic storing portion for storing a relationship between the first state quantity and the second state quantity, obtained from the dislocation at a time of proper operation of the movable portion, calculated in advance; state quantity estimating means for calculating an estimated state quantity by using the relationship that is stored in the characteristic storing portion to estimate the second state quantity from the first state quantity that was calculated by the first calculating means; diagnostic calculating means for evaluating a malfunction in the movable portion by comparing the second state quantity, calculated by the second calculating means, to the estimated state quantity; and a diagnosing operation controlling portion for stopping the evaluating operation of the diagnosing portion based on a control instruction value for controlling the dislocation of the movable portion.

The stick-slip detecting device according to the present invention has a diagnosing portion for evaluating a malfunction of the movable portion including dislocation detecting means for detecting a dislocation of a movable portion having a contact sliding portion; first calculating means for calculating a first state quantity from the dislocation; second calculating means for calculating a second state quantity from the dislocation; a characteristic storing portion for storing a relationship between the first state quantity and the second state quantity, obtained from the dislocation at a time of proper operation of the movable portion, calculated in advance; a diagnostic calculating portion for evaluating a malfunction in the movable portion by comparing the relationship between the first state quantity, calculated by the first state quantity calculating portion, and the second state quantity, calculated by the second state quantity calculating portion, to the relationship stored in the characteristic storing portion; and a diagnosing operation controlling portion for stopping the evaluating operation of the diagnosing portion based on a control instruction value for controlling the dislocation of the movable portion.

In either of the stick-slip detecting devices set forth above, the diagnosing operation controlling portion may stop the operation of first calculating means and second calculating means based on a control instruction value, to stop the evaluating operation of the diagnosing portion. Additionally, the diagnosing operation controlling portion may stop the operation of the diagnostic calculating means based on a control instruction value to stop the evaluation operation of the diagnosing portion.

In the stick-slip detecting device; the diagnosing operation controlling portion may include a dislocation magnitude calculating means for calculating a dislocation magnitude of a control instruction value, and an operation controlling means for stopping an evaluating operation of a diagnosing portion by detecting the dislocation magnitude, calculated by the dislocation magnitude calculating means, exceeding a threshold value that has been set in advance. Additionally, the diagnosing operation controlling portion may comprise third calculating means for calculating a third state quantity from a control instruction value, fourth calculating means for calculating a fourth state quantity from a control instruction value, and operation controlling means for stopping an evaluating operation of the diagnosing portion by detecting a first ratio that indicates the ratio of the second state quantity relative to the first state quantity exceeding a second ratio that indicates the ratio of the fourth state quantity relative to the third state quantity.

In the stick-slip detecting device, the first state quantity may be a magnitude of a small change in the dislocation, and the second state quantity may be a magnitude of a small change in the magnitude of the small change of the dislocation. For example, this magnitude of, a small change may be, for example, the mean square of first-order differential values or first-order difference values, and the magnitude of a small change in the magnitude of a small change may be a mean square of second-order differential values or second-order difference values. Additionally, the first state quantity may be the average of absolute values of first-order difference values in the dislocation and the second state quantity may be the root mean square of the first-order difference values for the dislocation. Furthermore, the first calculating means may include difference calculating means for calculating first-order difference values of the dislocations detected by the dislocation detecting means, first sum calculating means for calculating the sum of the absolute values of the first-order difference values obtained from the difference calculating means, and first average calculating means for calculating the first state quantity from the average of some or all of the sums of absolute values of the first-order difference values obtained from the first sum calculating means, and the second calculating means may include second sum calculating means for calculating the sum of squares of the first-order difference values obtained from the difference calculating means, and second average calculating means for calculating the second state quantity from the average of some or all of the sum of squares of the first-order difference values obtained from the second sum calculating means.

Furthermore, in the stick-slip detecting method as set forth in the present invention a dislocation of a movable portion having a contact sliding portion is detected; a first state quantity is calculated from the dislocation; a second state quantity is calculated from the dislocation; a relationship between the first state quantity and the second state quantity, obtained from the dislocation at a time of proper operation of the movable portion, calculated in advance, is used to calculate an estimated state quantity by estimating the second state quantity from the calculated first state quantity; a malfunction of the movable portion is evaluated by comparing the calculated second state quantity to the estimated state quantity; and the malfunction evaluating operation is stopped based on a control instruction value for controlling the dislocation of the movable portion.

Furthermore, in the stick-slip detecting method as set forth in the present invention a dislocation of a movable portion having a contact sliding portion is detected; a first state quantity is calculated from the dislocation; a second state quantity is calculated from the dislocation; a relationship between the first state quantity and the second state quantity, obtained from the dislocation at a time of proper operation of the movable portion, calculated in advance, and a relationship between the first state quantity calculated by the first calculating means and the second state quantity calculated by the second calculating means are compared to evaluate the malfunction of the movable portion; and the malfunction evaluating operation is stopped based on a control instruction value for controlling the dislocation of the movable portion.

In the stick-slip detecting methods set forth above, in stopping the malfunction evaluating operation, the operations for calculating the first state quantity and for calculating the second state quantity may be stopped based on a control command value. Additionally, in stopping the malfunction evaluating operation, the evaluating operation may be stopped based on a control instruction value. Furthermore, in stopping the malfunction evaluating operation, the evaluating operation may be stopped by calculating a magnitude of change of a control instruction value and detecting that the calculated magnitude of change has exceeded a threshold value that has been set in advance. Additionally, in stopping the malfunction evaluating operation, the evaluating operation may be stopped by calculating a third state quantity from a control instruction value, calculating a fourth state quantity from a control instruction value, and detecting that a first ratio indicating the ratio of the second state quantity to the first state quantity exceeds a second ratio indicating the ratio of the fourth state quantity to the third state quantity.

In the stick-slip detecting method, the first state quantity may be a magnitude of a small change in the dislocation, and the second state quantity may be a magnitude of a small change in the magnitude of the small change of the dislocation. For example, this magnitude of a small change may be, for example, the mean square of first-order differential values or first-order difference values, and the magnitude of a small change in the magnitude of a small change may be a mean square of second-order differential values or second-order difference values. Additionally, the first state quantity may be the average of absolute values of first-order difference values in the dislocation and the second state quantity may be the root mean square of the first-order difference values for the dislocation. Furthermore, in calculating the first state quantity, first-order difference values of the dislocations detected by the dislocation detecting means may be calculated, a sum of the absolute values of the first-order difference values may be calculated, and the first state quantity may be calculated from the average of some or all of the sums of absolute values of the first-order difference values, and in calculating the second state quantity, the sum of squares of the first-order difference values may be calculated and the second state quantity may be calculated from the average of some or all of the sum of squares of the first-order difference values.

As explained above, the present invention makes it possible to stop the malfunction evaluating operation based on a control instruction value for controlling the dislocation of a movable portion, and thus has a superior effect of enabling the evaluation of a stick-slip state more accurately depending on the state of control.

DETAILED DESCRIPTION OF THE INVENTION

Forms for carrying out the present invention will be explained below in reference to the figures.

Figure 1:
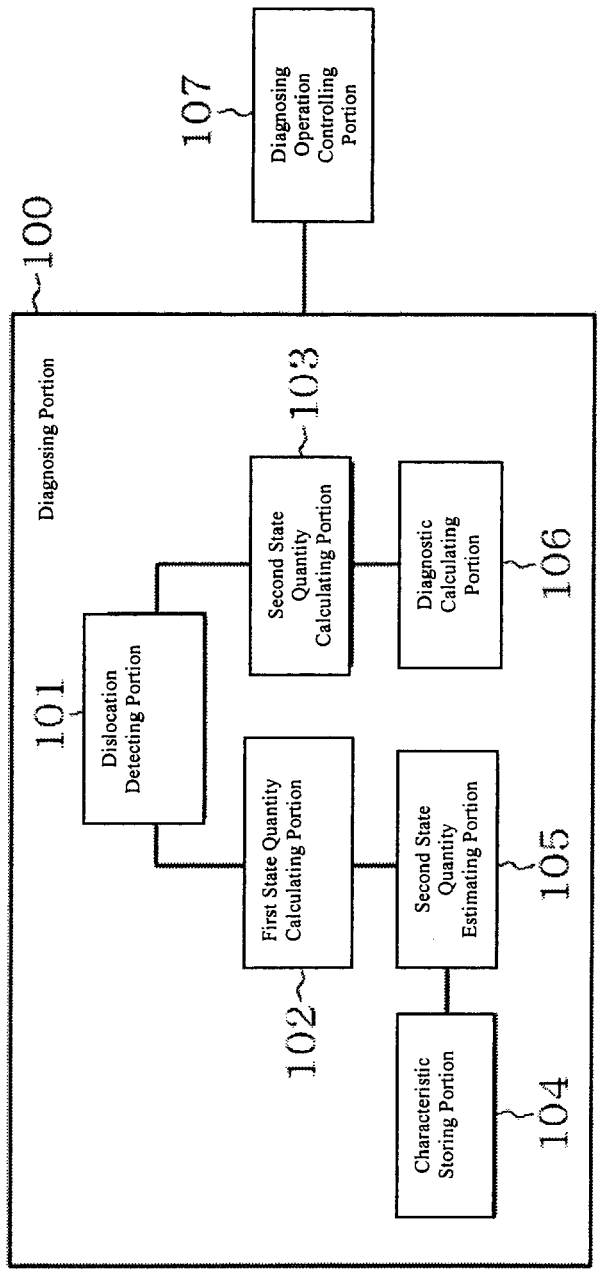
FIG. 1 is a structural diagram illustrating the structure of a stick-slip detecting device as set forth in an example according to the present invention.

First FIG. 1 will be used to explain an example according to the present invention. FIG. 1 is a structural diagram illustrating the structure of a stick-slip detecting device in an example according to the present invention. This stick-slip detecting device is first provided with a diagnosing portion 100 for evaluating a malfunction in a movable portion that has a contact sliding portion such as an regulator valve wherein a valve stem dislocation is controlled by, for example, a positioner. Additionally, a diagnosing operation controlling portion 107 is provided for stopping the operation of the diagnosing portion 100 based on a control instruction value for controlling the dislocation of a movable portion of a valve unit, or the like.

Additionally, the diagnosing portion 100 is provided with a dislocation detecting portion 101, a first state quantity calculating portion (first calculating means) 102, a second state quantity calculating portion (second calculating means) 103, a characteristic storing portion 104, a second state quantity estimating portion 105, and a diagnostic calculating portion 106.

The dislocation detecting portion 101 detects (measures) the dislocation of the movable portion of the valve unit, or the like. The first state quantity calculating portion 102 calculates a first state quantity from the detected dislocation of the movable portion. The second state quantity calculating portion 103 calculates a second state quantity from the detected dislocation of the movable portion. The characteristic storing portion 104 stores a relationship between the first state quantity and the second state quantity obtained from the dislocation at a time when the movable portion is operating properly, calculated in advance. The second state quantity estimating portion 105 uses the relationship stored in the characteristic storing portion 104 to calculate an estimated state quantity by estimating the second state quantity from the first state quantity that has been calculated by the first state quantity calculating portion 102. The diagnostic calculating portion 106 evaluates a malfunction in the movable portion by comparing the estimated state quantity to the second state quantity calculated by the second state quantity calculating portion 103.

The diagnosing operation controlling portion 107 will be explained in more detail next. A control instruction value (dislocation instruction value) for controlling the dislocation of a valve stem (a movable portion) from the outside is applied as a control signal to a positioner, for example, and the dislocation of the valve stem is controlled based on the control signal. The diagnosing operation controlling portion 107 controls the operation of the diagnosing portion 100 based on this type of control signal.

For example, the diagnosing operation controlling portion 107 compares the magnitude of change of the control instruction value relative to the dislocation of the valve stem to a reference value that has been set in advance, and if the magnitude of change per unit time in the control instruction value exceeds the reference value, then the malfunction evaluating operation in the diagnosing portion 100 is stopped. When the magnitude of change per unit time in the control instruction value exceeds the reference value, then even if operating properly, the evaluation may be identical to the case wherein a stick-slip has occurred. In contrast, the diagnosing operation controlling portion 107, when the magnitude of change per unit time of the control instruction value exceeds the reference value, stops the operation of the diagnosing portion 100, thus making it possible to prevent an incorrect stick-slip evaluation.

The reference value will be explained briefly here.

Control instruction values are applied in the shape of a square wave, so as to reciprocate between two values, A1 and A2, to a movable portion (which is subject to detection) that is in a normal state wherein there is no stick-slip state. The time interval for switching the control instruction value preferably is about the same as the interval for the changes in the instruction values with the highest frequencies occurring during the actual operations. The two state quantities are calculated from the dislocation measurement values wherein the results of the movable portion being operated by the control instruction values have been measured, and are applied to the method set forth in JP '624, to evaluate proper operation versus a malfunction. In this evaluation, if the evaluation is that of a malfunction, then the magnitude of change in the control instruction value applied is a value that may cause an incorrect detection, and thus the difference between A1 and A2 is reduced slightly and the experiment is performed again.

Performing the operations using control instruction values obtained experimentally in this way makes it possible to determine how large the magnitude between A1 and A2 (the magnitude of change in the control instruction values) must be to cause an incorrect malfunction detection. Consequently, the lower limit for the magnitude of change in the control instruction value that will be evaluated as a malfunction can be calculated, and this lower limit value may be used as the reference value. When a control instruction value that exceeds a reference value determined in this way is applied, then, through that which is described above, the diagnosing portion 100 can be considered to incorrectly evaluate the occurrence of stick-slip. In other words, it is possible to prevent an incorrect evaluation through the diagnosing operation controlling portion 107 stopping the operation of the diagnosing portion 100 when a control instruction value that exceeds the aforementioned reference value is applied.

Note that if there is a mathematical model of that which is to be detected when operating properly, then instead of the method for determining the reference value described above, a computer simulation may be used to determine a specific threshold value in the same way. Note that in this case is necessary to calculate the state quantities after applying the tolerances and the same amounts of external noise for the dislocation detecting portion 101.

Additionally, the diagnosing operation controlling portion 107 calculates a third state quantity from the control instruction value, in the same manner as with the first state quantity calculating portion 102 described above, calculates a fourth state quantity in the same manner as with the second state quantity calculating portion 103, described above, and stops the evaluating operation of the diagnosing portion 100 when a second ratio that indicates the ratio of the fourth state quantity to the third state quantity exceeds a first ratio that indicates the ratio of the second state quantity to the first state quantity.

When a control signal value is applied to cause an operation wherein it is evaluated, in the diagnosing portion 100, that a stick-slip has occurred, then the dislocation of a movable portion that is operating properly will behave smoothly based on the control instruction value. Consequently, the ratio of the second state quantity to the first state quantity (that is, the second state quantity divided by the first state quantity), calculated from the dislocations that are measured for the movable portion when in this state, will be larger than the ratio of the fourth state quantity to the third state quantity (that is, the fourth state quantity divided by the third state quantity), calculated from the control instruction values. Consequently, if it is detected that the "fourth state quantity divided by the third state quantity" is larger than the "second state quantity divided by the first state quantity", then stopping the evaluating operation of the diagnosing portion 100 can prevent an incorrect evaluation of the stick-slip.

Note that the diagnosing operation controlling portion 107 may stop the evaluating operation in the diagnosing portion 100 by stopping the calculating operation, for example, in the first state quantity calculating portion 102 and the second state quantity calculating portion 103. Additionally, the evaluating operation in the diagnosing portion 100 may be stopped by, for example, stopping the operation of the diagnostic calculating portion 106. The diagnosing operation controlling portion 107, after stopping the operation of the diagnosing portion 100 as described above, may restart (or start) the operation of the diagnosing portion 100 after a time that has been set. Here, at the point in time of detecting that there is a problem in the control instruction value, as described above, the first state quantity and the second state quantity may have already been calculated. In this case, preventing incorrect detection by stopping the operations of the individual state quantity calculating portions would be unreliable. Consequently, the incorrect detection can be prevented more reliably by stopping the evaluating operations in the diagnosing portion 100.

As described above, in the present form of embodiment, there is the distinctive feature of detecting the dislocation of a movable portion that has a contact sliding portion, calculating a first state quantity from the dislocation, then calculating a second state quantity from the calculated dislocation, followed by using the first state quantity and the second state quantity obtained from the dislocations wherein the movable portion is operating properly, calculated in advance, to calculate an estimated state quantity by calculating the second state quantity from the calculated first state quantity, and then evaluating a malfunction in the movable portion by comparing the calculated second state quantity to the estimated state quantity, and, additionally, stopping the malfunction evaluating operation based on a control instruction value for controlling the dislocation of the movable portion.

Given the present example, the diagnosing operation controlling portion 107 controls the operation of the diagnosing portion 100 based on a control instruction value for the movable portion, thus making it possible to prevent an incorrect evaluation of the stick-slip, making it possible to evaluate the stick-slip status more accurately in accordance with the state of control.

Figure 2:
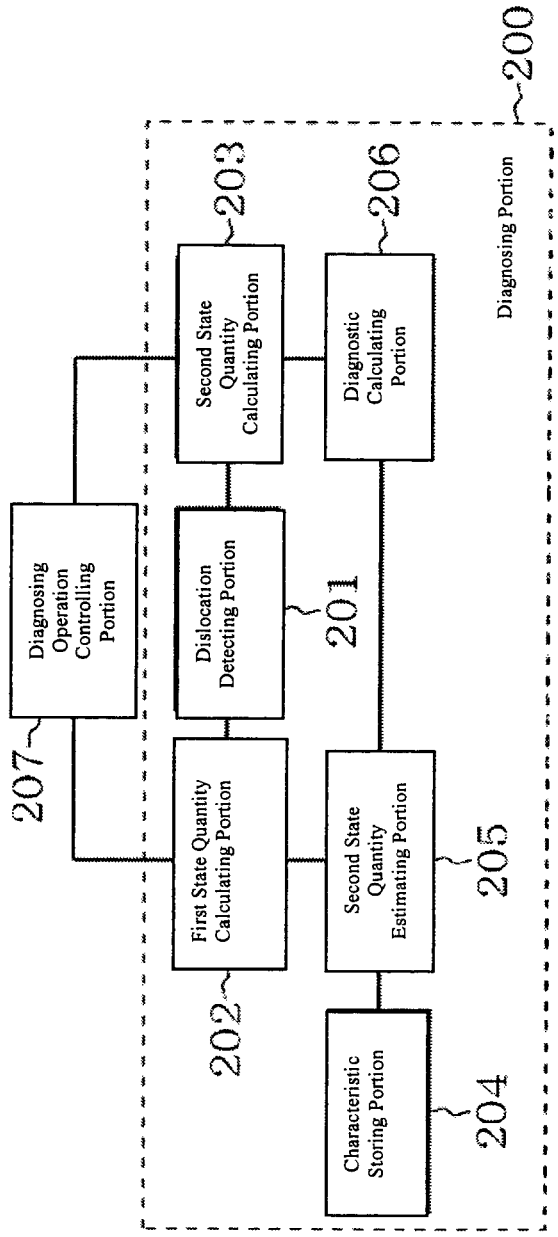
FIG. 2 is a structural diagram illustrating the structure of a stick-slip detecting device as set forth in another example according to the present invention.

FIG. 2 will be used to explain another example according to the present invention. FIG. 2 is a structural diagram illustrating the structure of a stick-slip detecting device according to the present invention. This stick-slip detecting device is provided with a diagnosing portion 200 for evaluating a malfunction in a movable portion that has a contact sliding portion, and a diagnosing operation controlling portion 207 for stopping the operation of the diagnosing portion 200 based on a control instruction value for controlling the dislocation of the movable portion. The diagnosing portion 200 is provided with a dislocation detecting portion 201, a first state quantity calculating portion 202 (first calculating means), a second state quantity calculating portion 203 (second calculating means), a characteristic storing portion 204, a second state quantity estimating portion 205, and a diagnostic calculating portion 206.

The dislocation detecting portion 201 detects (measures) the dislocation of a movable portion of a valve unit, or the like, and outputs a dislocation signal that is a digital signal.

The first state quantity calculating portion 202 calculates a mean square of first-order difference values as a first state quantity from dislocation signals outputted from the dislocation detecting portion 201 as the measured values that indicate the dislocations detected for the movable portion. Additionally, the second state quantity calculating portion 203 calculates the mean square of second-order difference values as the second state quantity from the dislocation signals outputted from the dislocation detecting portion 201. The mean square of the first-order difference values and the mean square of the second-order differences value may be calculated using Equation (3) and Equation (4), below.

$$\overline{(\delta x_\tau)^2} = \frac{1}{N+1} \sum_{i=0}^{N} (\delta x_{\tau-i\Delta t})^2 \qquad (3)$$

$$\overline{(\delta^2 x_\tau)^2} = \frac{1}{N+1} \sum_{i=0}^{N} (\delta^2 x_{\tau-i\Delta t})^2 \qquad (4)$$

Note that $\delta x$ is the difference in x over the time period $\delta t$, and is calculated through Equation (5), below. Furthermore, $\delta^2 x$ is the difference in $\delta x$ over the time period $\delta t$, and is calculated similarly.

$$\delta x_1 = x_{1+\Delta 1} - x_1 \qquad (5)$$

The characteristic storing portion 204 stores the relationship between the first state quantity and the second state quantity obtained from the dislocations at the time of proper operation of the movable portion, calculated in advance. For example, the characteristic storing portion 204 stores, as the relationship (characteristic formula) between the mean square of the first-order difference values and the mean square of the second-order difference values of the dislocation signal when the sliding operation of the movable portion is in the properly operating state, a linear approximation characteristic formula using two constants A and B, as illustrated by Equation (6), for example, below:

$$\overline{(\delta^2 x_\tau)^2} = A\overline{(\delta x_\tau)^2} + B \qquad (6)$$

The second state quantity estimating portion 205 uses the relationship stored in the characteristic storing portion 204 to calculate an estimated state quantity by estimating the second state quantity (the mean square of the second-order difference values) from the first state quantity (the mean square of the first-order difference values) calculated by the first state quantity calculating portion 202. For example, the second state quantity estimating portion 205 substitutes into Equation (6) the mean square for the first-order difference values, calculated by the first state quantity calculating portion 202, to calculate an estimated state quantity corresponding to the mean square of the second-order difference values.

The diagnostic calculating portion 206 evaluates a malfunction in the movable portion by comparing the estimated state quantity to the second state quantity calculated by the second state quantity calculating portion 203. For example, the diagnostic calculating portion 206 calculates the difference between the mean square of the second-order difference values calculated by the second state quantity calculating portion 203 and the estimated state quantity estimated by the second state quantity estimating portion 205, and if, for example, the calculated difference is greater than a specific value, then concludes that a stick-slip has occurred.

As described above, during the evaluation of the stick-slip (a malfunction in the movable portion) by the diagnosing portion 200, in the present form of embodiment the diagnosing operation controlling portion 207 stops the evaluating operation of the diagnosing portion 200 by stopping the operation of the first state quantity calculating portion 202 and the second state quantity calculating portion 203 based on a control instruction value to the movable portion. If, for example, the magnitude of change per unit time in the control instruction value to the movable portion of a valve unit, or the like, exceeds a reference value, then the diagnosing operation controlling portion 207 stops the calculating operations in the first state quantity calculating portion 202 and in the second state quantity calculating portion 203. Doing so can prevent an incorrect stick-slip evaluation caused by the control instruction value to the movable portion, as described above, by stopping the stick-slip evaluation in the diagnosing portion 200.

Note that the dislocation signal outputted from the dislocation detecting portion 201 is a digital signal, and while the mean square of the first-order difference values was calculated as the first state quantity and the mean square of the second-order difference values was calculated as the second state quantity, there is no limitation thereto. For example, the average absolute value of the first-order difference value may be calculated as the first state quantity and the root mean square of the first-order difference value may be calculated as the second state quantity, as in Equation (1). Moreover, if the dislocation value is an analog signal, then the mean square of the first-order differential value may be calculated as the first state quantity, and the mean square of the second-order differential value may be calculated as the second state quantity.

For example, first the first state quantity calculating portion 202 may calculate the mean square over a time interval T, as indicated by Equation (7), shown below, from the first-order differential value of the dislocation value when the relative dislocation x is measured for two sliding objects (for example, a piston and a cylinder). Additionally, the second state quantity calculating portion 203 calculates the mean square, over the time interval T, from the second-order differential value of the dislocation signal, as shown in Equation (8), below.

$$\overline{(\dot{x})^2} = \frac{1}{T} \int_{\tau-T}^{\tau} \dot{x}_t^2 \, dt \quad (7)$$

Here $x'_t$ is the first-order differential value at time t.

$$\overline{(\ddot{x})^2} = \frac{1}{T} \int_{\tau-T}^{\tau} \ddot{x}_t^2 \, dt \quad (8)$$

Here $x''_t$ is the second-order differential value at time t.

On the other hand the characteristic storing portion 204 stores, as the relationship (characteristic formula) between the mean square of the first-order difference values and the mean square of the second-order difference values of the dislocation signal when the sliding operation is in the properly operating state, a linear approximation characteristic formula using two constants A and B, as illustrated by Equation (9), for example, below:

$$\overline{(\ddot{x})^2} = A\overline{(\dot{x})^2} + B \quad (9)$$

In the second state quantity estimating portion 205, the characteristic equation indicated in Equation (9) is used to estimate the mean square of the second-order differential values from the mean square of the first-order differential values obtained from the measured values. Additionally, in the diagnostic calculating portion 206, the difference between the mean square of the second-order differential values (the estimated state quantity) estimated (calculated) by the second state quantity estimating portion 205 and, the mean square of the second-order differential values calculated by the second state quantity calculating portion 203 is calculated. If this difference is greater than a specific value, then the diagnostic calculating portion 206 concludes that a stick-slip has occurred. Note that instead the mean square of the first-order differential values may be estimated from the mean square of the second-order differential values and this estimated mean square of the first-order differential values may be compared to the actual mean square of the first-order differential values obtained from the dislocations.

Figure 3:
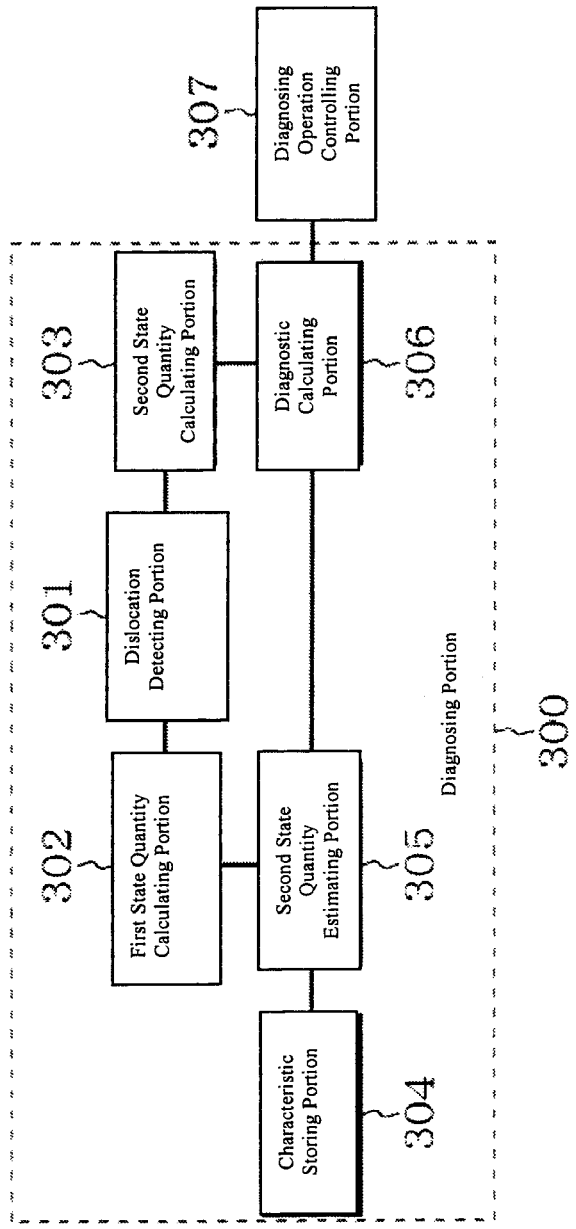
FIG. 3 is a structural diagram illustrating the structure of a stick-slip detecting device as set forth in a further example according to the present invention.

FIG. 3 will be used to explain a further example according to the present invention. FIG. 3 is a structural diagram illustrating the structure of a stick-slip detecting device as set forth according to the present invention. This stick-slip detecting device is provided with a diagnosing portion 300 for evaluating a malfunction in a movable portion that has a contact sliding portion, and a diagnosing operation controlling portion 307 for stopping the operation of the diagnosing portion 300 based on a control instruction value for controlling the dislocation of the movable portion. The diagnosing portion 300 is provided with a dislocation detecting portion 301, a first state quantity calculating portion 302 (first calculating means), a second state quantity calculating portion 303 (second calculating means), a characteristic storing portion 304, a second state quantity estimating portion 305, and a diagnostic calculating portion 306.

The dislocation detecting portion 301 detects (measures) the dislocation of a movable portion of a valve unit, or the like, and outputs a dislocation signal that is a digital signal.

The first state quantity calculating portion 302 calculates a mean square of first-order difference values as a first state quantity from dislocation signals outputted from the dislocation detecting portion 301 as the measured values that indicate the dislocations detected for the movable portion. Additionally, the second state quantity calculating portion 303 calculates the mean square of second-order difference values as the second state quantity from the dislocation signals outputted from the dislocation detecting portion 301.

The characteristic storing portion 304 stores the relationship between the first state quantity and the second state quantity obtained from the dislocations at the time of proper operation of the movable portion, calculated in advance. For example, the characteristic storing portion 304 stores, as the relationship (characteristic formula) between the mean square of the first-order difference values and the mean square of the second-order difference values of the dislocation signal when the sliding operation of the movable portion is in the properly operating state.

The second state quantity estimating portion 305 uses the relationship stored in the characteristic storing portion 304 to calculate an estimated state quantity by estimating the second state quantity (the mean square of the second-order difference values) from the first state quantity (the mean square of the first-order difference values) calculated by the first state quantity calculating portion 302.

The diagnostic calculating portion 306 evaluates a malfunction in the movable portion by comparing the estimated state quantity to the second state quantity calculated by the second state quantity calculating portion 303. For example, the diagnostic calculating portion 306 calculates the difference between the mean square of the second-order difference values calculated by the second state quantity calculating portion 303 and the estimated state quantity estimated by the second state quantity estimating portion 305, and if, for example, the calculated difference is greater than a specific value, then concludes that a stick-slip has occurred.

As described above, during the evaluation of the stick-slip (a malfunction in the movable portion) by the diagnosing portion 300, in the present form the diagnosing operation controlling portion 307 stops the evaluating operation of the diagnosing portion 300 by stopping the operation of diagnostic calculating portion 306 based on a control instruction value to the movable portion. If, for example, the magnitude of change per unit time in the control instruction value for the dislocation of the movable portion of a valve unit, or the like, exceeds a reference value, then the diagnosing operation controlling portion 307 stops the operation for evaluating the occurrence of stick-slip in the diagnostic calculating portion 306. Doing so can prevent an incorrect stick-slip evaluation caused by the control instruction value to the movable portion, as described above, by stopping the stick-slip evaluation in the diagnosing portion 300.

Note that the diagnosing operation controlling portion 307 may output an evaluation stop signal when the magnitude of change per unit time of the control instruction value for the dislocation of the movable portion is detected as exceeding a reference value, and when the diagnostic calculating portion 306 has concluded that a stick-slip has occurred, the diagnosing portion 300 (the diagnostic calculating portion 306) may stop the outputting of the evaluation results if the aforementioned evaluation stop signal is outputted.

Figure 4:
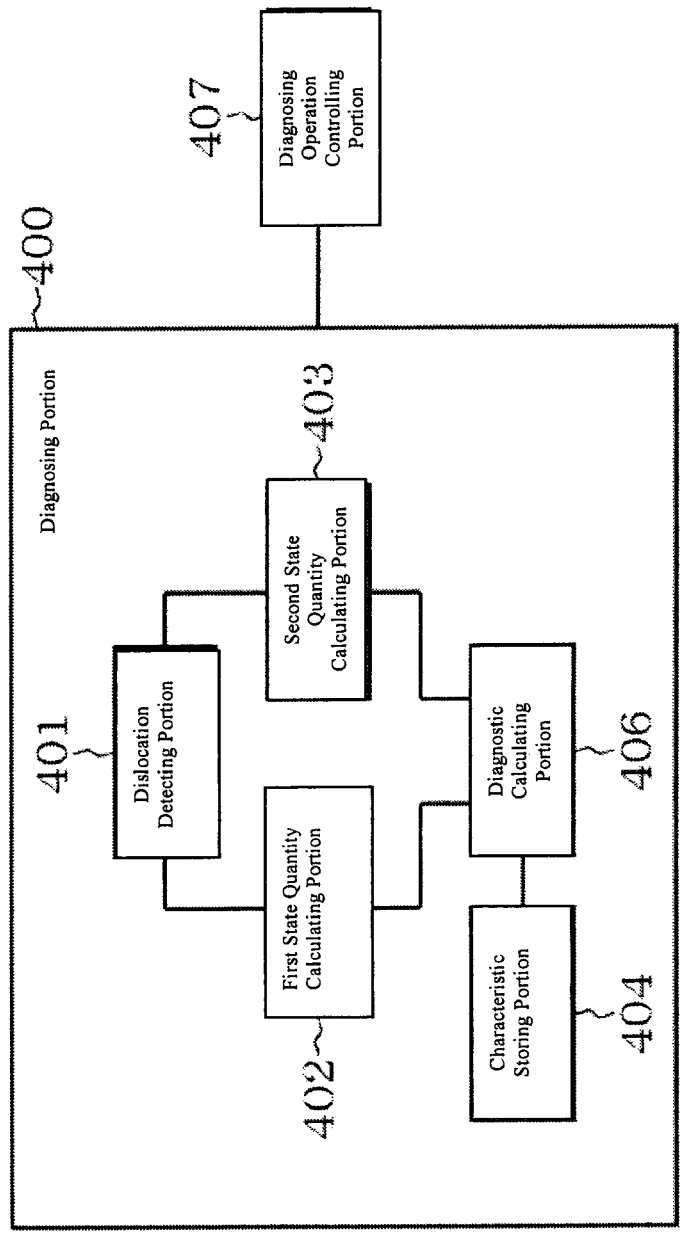
FIG. 4 is a structural diagram illustrating the structure of a stick-slip detecting device as set forth in an example according to the present invention.

FIG. 4 will be used to explain an example according to the present invention. FIG. 4 is a structural diagram illustrating the structure of a stick-slip detecting device as set forth according to the present invention. This stick-slip detecting device is provided, first with a diagnosing portion 400 for diagnosing a malfunction in a movable portion that has a contact sliding portion of, for example, a regulating valve, wherein the valve stem dislocation is controlled by, for example, a positioner. Furthermore, a diagnosing operation controlling portion 407 is provided for stopping the evaluating operation of the diagnosing portion 400 based on a control instruction value for controlling the dislocation of the moving portion of a valve unit, or the like.

Additionally, the diagnosing portion 400 is provided with a dislocation detecting portion 401, a first state quantity calculating portion 402 (first calculating means), a second state quantity calculating portion 403 (second calculating means), a characteristic storing portion 404, and a diagnostic calculating portion 406.

The dislocation detecting portion 401 detects (measures) the dislocation of a movable portion of a valve unit, or the like. The first state quantity calculating portion 402 calculates a first state quantity from the detected dislocations. The second state quantity calculating portion 403 calculates a second state quantity from the detected dislocations. The characteristic storing portion 404 stores the relationship between the first state quantity and the second state quantity obtained from the dislocations at the time of proper operation of the movable portion, calculated in advance. The diagnostic calculating portion 406 evaluates a malfunction in the movable portion by comparing the relationship between the first state quantity, calculated by the first state quantity calculating portion 402, and the second state quantity, calculated by the second state quantity calculating portion 403, to the relationship stored in the characteristic storing portion 404.

The diagnosing operation controlling portion 407 will be explained in more detail next. A dislocation instruction value (control instruction value) for controlling the dislocation of a valve stem (a movable portion) from the outside is applied as a control signal to a positioner, for example, and the dislocation of the valve stem is controlled based on the control signal. The diagnosing operation controlling portion 407 controls the operation of the diagnosing portion 400 based on this type of control signal.

For example, the diagnosing operation controlling portion 407 compares the magnitude of change of the control instruction value relative to the dislocation of the valve stem to a reference value that has been set in advance, and if the magnitude of change per unit time in the control instruction value exceeds the reference value, then the malfunction evaluating operation in the diagnosing portion 400 is stopped. When the magnitude of change per unit time in the control instruction value exceeds the reference value, then even if operating properly, the evaluation may be identical to the case wherein a stick-slip has occurred. In contrast, the diagnosing operation controlling portion 407, when the magnitude of change per unit time of the control instruction value exceeds the reference value, stops the operation of the diagnosing portion 400, thus making it possible to prevent an incorrect stick-slip evaluation. These operations are identical to those in the examples described above.

Even in the present form described above, as with the above examples described previously, the diagnosing operation controlling portion 407 controls the operation of the diagnosing portion 400 based on the control instruction values to the movable portion, and thus is able to evaluate the stick-slip state more accurately in accordance with the state of control, because of the ability to, for example, prevent an incorrect stick-slip evaluation.

Figure 5:
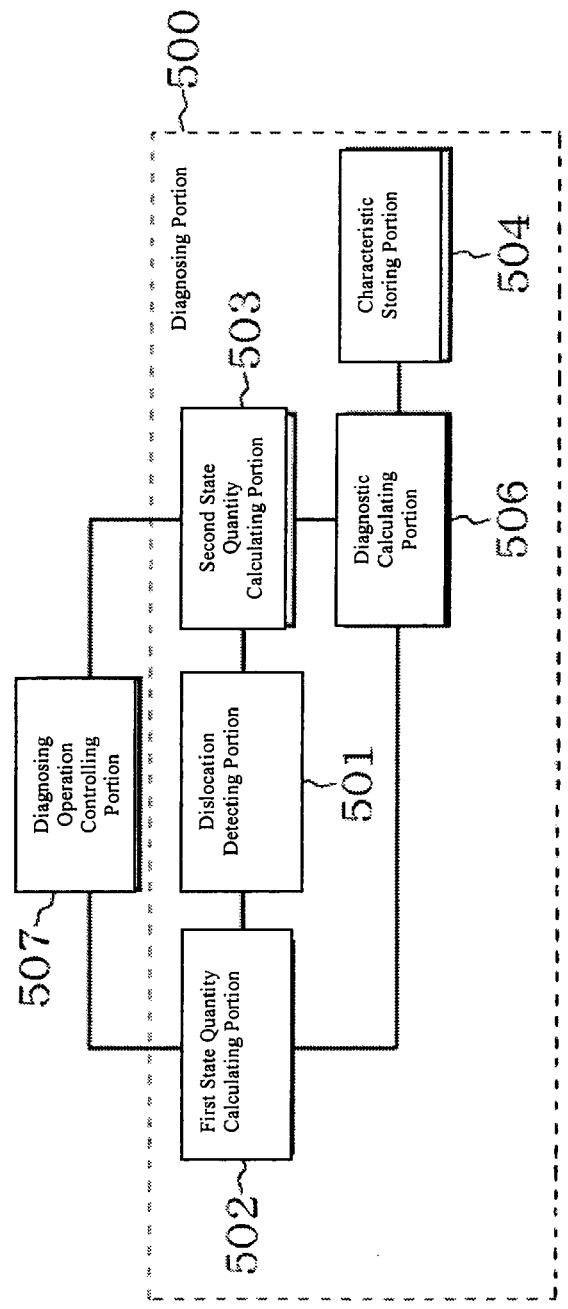
FIG. 5 is a structural diagram illustrating the structure of a stick-slip detecting device as set forth in another example according to the present invention.

FIG. 5 will be used to explain another example according to the present invention. FIG. 5 is a structural diagram illustrating the structure of a stick-slip detecting device as set forth according to the present invention. This stick-slip detecting device is provided with a diagnosing portion 500 for evaluating a malfunction in a movable portion that has a contact sliding portion, and a diagnosing operation controlling portion 507 for stopping the operation of the diagnosing portion 500 based on a control instruction value for controlling the dislocation of the movable portion. The diagnosing portion 500 is provided with a dislocation detecting portion 501, a first state quantity calculating portion 502 (first calculating means), a second state quantity calculating portion 503 (second calculating means), a characteristic storing portion 504, and a diagnostic calculating portion 506.

The dislocation detecting portion 501 detects (measures) the dislocation of a movable portion of a valve unit, or the like, and outputs a dislocation signal that is a digital signal.

The first state quantity calculating portion 502 calculates a mean square of first-order difference values as a first state quantity from dislocation signals outputted from the dislocation detecting portion 501 as the measured values that indicate the dislocations detected for the movable portion. Additionally, the second state quantity calculating portion 503 calculates the mean square of second-order difference values as the second state quantity from the dislocation signals outputted from the dislocation detecting portion 501.

The characteristic storing portion 504 stores the relationship between the first state quantity and the second state quantity obtained from the dislocations at the time of proper operation of the movable portion, calculated in advance. The diagnostic calculating portion 506 calculates the relationship between the first state quantity calculated by the first state quantity calculating portion 502 and the second state quantity calculated by the second state quantity calculating portion 503, and compares this relationship to the relationship stored in the characteristic storing portion 504, to detect an occurrence of stick-slip.

As described above, during the evaluation of the stick-slip (a malfunction in the movable portion) by the diagnosing portion 500, in the present form of embodiment the diagnosing operation controlling portion 507 stops the evaluating operation of the diagnosing portion 500 by stopping the operation of the first state quantity calculating portion 502 and the second state quantity calculating portion 503 based on a control instruction value to the movable portion. If, for example, the magnitude of change per unit time in the control instruction value for the dislocation of the movable portion of a valve unit, or the like, exceeds a reference value, then the diagnosing operation controlling portion 507 stops the calculating operations in the first state quantity calculating portion 502 and in the second state quantity calculating portion 503. Doing so can prevent an incorrect stick-slip evaluation caused by the control instruction value to the movable portion, as described above, by stopping the stick-slip evaluation in the diagnosing portion 500.

Note that the dislocation signal outputted from the dislocation detecting portion 501 is a digital signal, and while the mean square of the first-order difference values was calculated as the first state quantity and the mean square of the second-order difference values was calculated as the second state quantity, there is no limitation thereto. The average absolute value of the first-order difference value may be calculated as the first state quantity and the root mean square of the first-order difference value may be calculated as the second state quantity, as in Equation (1). If the dislocation value is an analog signal, then the mean square of the first-order differential value may be calculated as the first state quantity, and the mean square of the second-order differential value may be calculated as the second state quantity.

Figure 6:
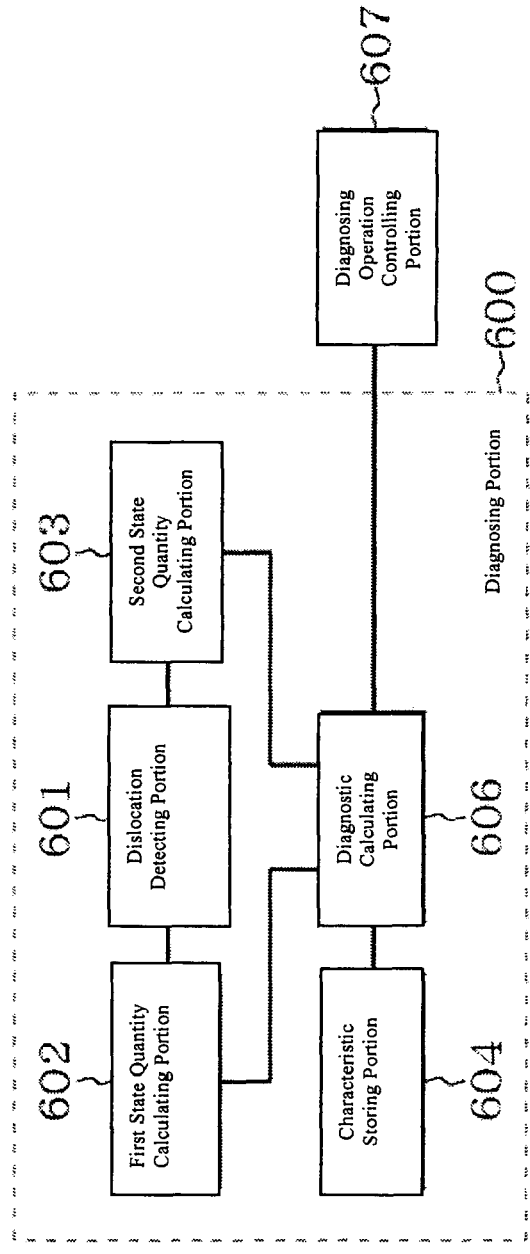
FIG. 6 is a structural diagram illustrating the structure of a stick-slip detecting device as set forth in a further example according to the present invention.

FIG. 6 will be used to explain a further example according to the present invention. FIG. 6 is a structural diagram illustrating the structure of a stick-slip detecting device as set forth according to the present invention. This stick-slip detecting device is provided with a diagnosing portion 600 for evaluating a malfunction in a movable portion that has a contact sliding portion, and a diagnosing operation controlling portion 607 for stopping the operation of the diagnosing portion 600 based on a control instruction value for controlling the dislocation of the movable portion. The diagnosing portion 600 is provided with a dislocation detecting portion 601, a first state quantity calculating portion 602 (first calculating means), a second state quantity calculating portion 603 (second calculating means), a characteristic storing portion 604, and a diagnostic calculating portion 606.

The dislocation detecting portion 601 detects (measures) the dislocation of a movable portion of a valve unit, or the like, and outputs a dislocation signal that is a digital signal.

The first state quantity calculating portion 602 calculates a mean square of first-order difference values as a first state quantity from dislocation signals outputted from the dislocation detecting portion 601 as the measured values that indicate the dislocations detected for the movable portion. Additionally, the second state quantity calculating portion 603 calculates the mean square of second-order difference values as the second state quantity from the dislocation signals outputted from the dislocation detecting portion 601.

The characteristic storing portion 604 stores the relationship between the first state quantity and the second state quantity obtained from the dislocations at the time of proper operation of the movable portion, calculated in advance. The diagnostic calculating portion 606 calculates the relationship between the first state quantity calculated by the first state quantity calculating portion 602 and the second state quantity calculated by the second state quantity calculating portion 603, and compares this relationship to the relationship stored in the characteristic storing portion 604, to detect an occurrence of stick-slip.

As described above, during the evaluation of the stick-slip (a malfunction in the movable portion) by the diagnosing portion 600, in the present form of embodiment the diagnosing operation controlling portion 607 stops the evaluating operation of the diagnosing portion 600 by stopping the operation of diagnostic calculating portion 606 based on a control instruction value to the movable portion. If, for example, the magnitude of change per unit time in the control instruction value for the dislocation of the movable portion of a valve unit, or the like, exceeds a reference value, then the diagnosing operation controlling portion 607 stops the operation for evaluating the occurrence of stick-slip in the diagnostic calculating portion 606. Doing so can prevent an incorrect stick-slip evaluation caused by the control instruction value to the movable portion, as described above, by stopping the stick-slip evaluation in the diagnosing portion 600.

Note that the diagnosing operation controlling portion 607 may output an evaluation stop signal when the magnitude of change per unit time of the control instruction value for the dislocation of the movable portion is detected as exceeding a reference value, and when the diagnostic calculating portion 606 has concluded that a stick-slip has occurred, the diagnosing portion 600 (the diagnostic calculating portion 606) may stop the outputting of the evaluation results if the aforementioned evaluation stop signal is outputted.

Figure 7:
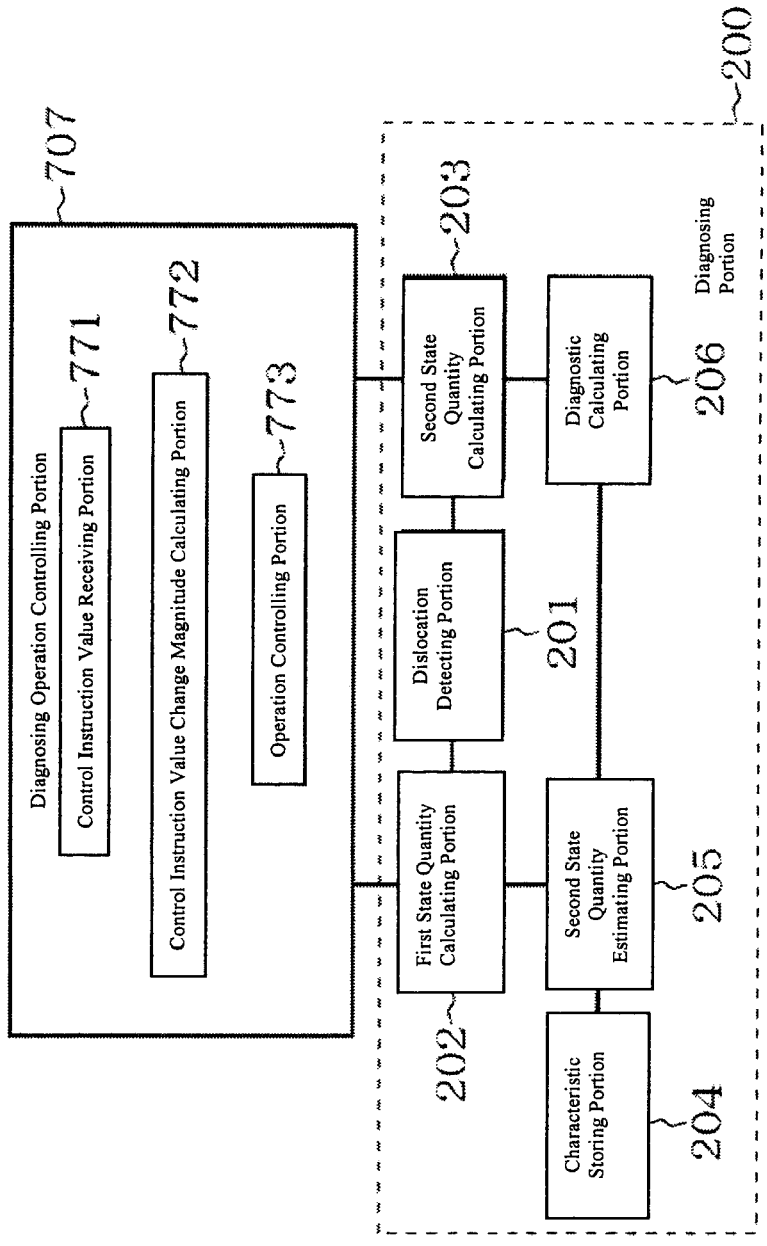
FIG. 7 is a structural diagram illustrating the structure of a stick-slip detecting device as set forth in an example according to the present invention.

FIG. 7 will be used to explain an example according to the present invention. FIG. 7 is a structural diagram illustrating the structure of a stick-slip detecting device as set forth according to the present invention. This stick-slip detecting device is provided with a diagnosing portion 200 for evaluating a malfunction in a movable portion that has a contact sliding portion, and a diagnosing operation controlling portion 707 for stopping the operation of the diagnosing portion 200 based on a control instruction value for controlling the dislocation of the movable portion. The diagnosing portion 200 is provided with a dislocation detecting portion 201, a first state quantity calculating portion 202 (first calculating means), a second state quantity calculating portion 203 (second calculating means), a characteristic storing portion 204, a second state quantity estimating portion 205, and a diagnostic calculating portion 206. These structures are identical to those described above.

In the present form of embodiment, the diagnosing operation controlling portion 707 is provided with a control instruction value receiving portion 771, a control instruction value change magnitude calculating portion 772, and an operation controlling portion 773.

The control instruction value receiving portion 771 receives a control instruction value to the positioner of, for example, a regulating valve that is the subject of the diagnosis by the diagnosing portion 200. The control instruction value change magnitude calculating portion 772 calculates the magnitude of the change per unit time that has been set in advance from the change in the control instruction value received by the control instruction value receiving portion 771. The operation controlling portion 773 stops the evaluating operation by the diagnosing portion 200, by stopping the operation of the first state quantity calculating portion 202 and the second state quantity calculating portion 203, if the magnitude of change calculated by the control instruction value change magnitude calculating portion 772 exceeds a reference value that has been set.

Figure 8:
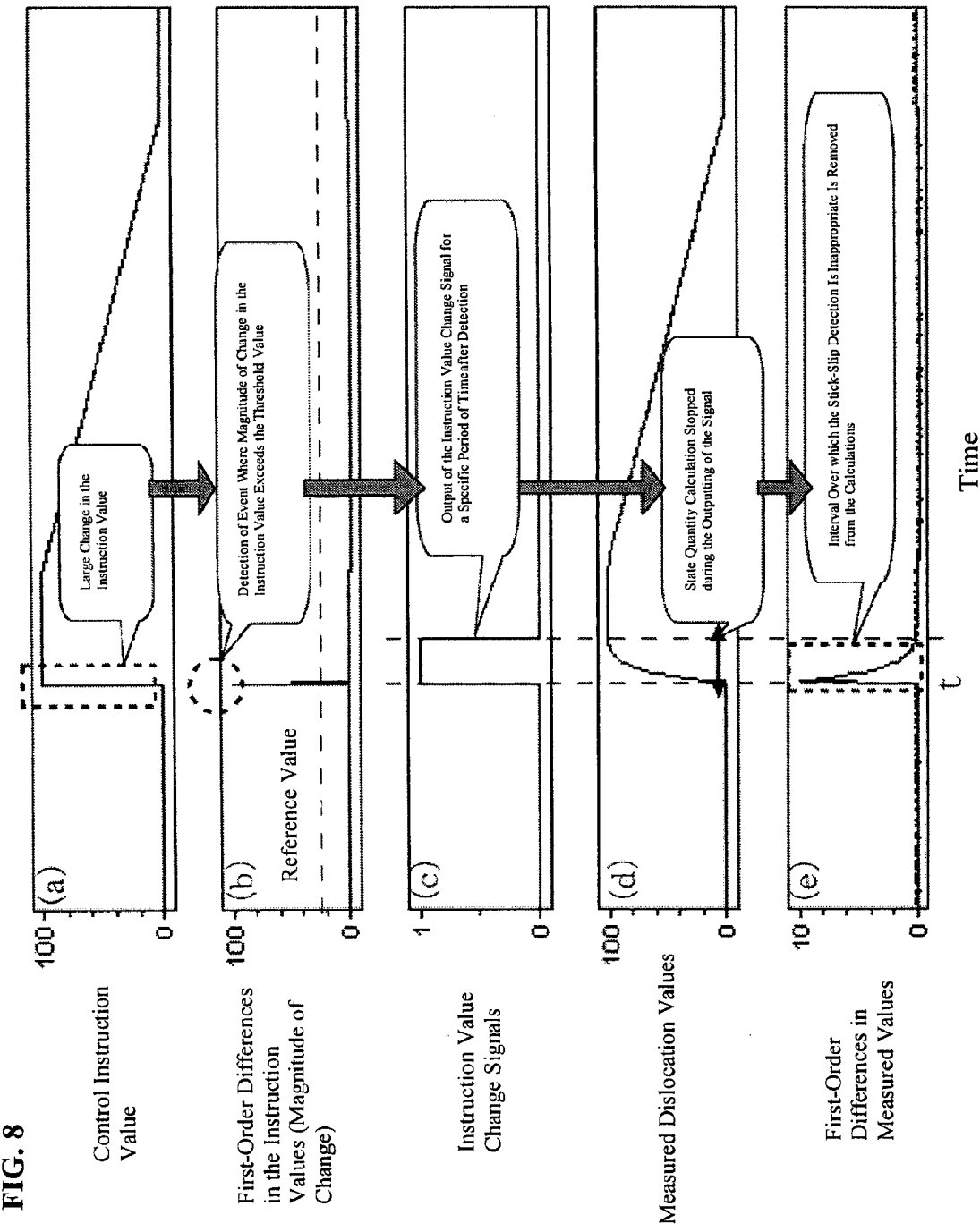
FIG. 8 is a timing chart illustrating the changes in the control instruction values, the first-order differences in the control instruction values, the instruction value change signals, the measured dislocation values, and the first-order differences in the measured values.

For example, the control instruction value receiving portion 771 receives a control instruction value such as illustrated in FIG. 8 (*a*). In the control instruction value change magnitude calculating portion 772, the first-order difference value is calculated for each unit time from the control instruction values that are received. The first-order difference values calculated by the control instruction value change magnitude calculating portion 772 change in a time series as illustrated in FIG. 8 (*b*). When, as illustrated in FIG. 8 (*a*) there is a large change in the control instruction value at time t, then, as illustrated in FIG. 8 (*b*), the first-order difference value will be a large value. When this value exceeds the reference value, then the operation controlling portion 773, as illustrated in FIG. 8 (*c*) will output an instruction value change signal continuously over a specific time period from time t.

When the first state quantity calculating portion 202 and the second state quantity calculating portion 203 receive this instruction value change signal, then the calculating operations are stopped in the first state quantity calculating portion 202 and the second state quantity calculating portion 203. The calculating operations are stopped in the first state quantity calculating portion 202 and the second state quantity calculating portion 203 over the interval over which the instruction value change signal is received. The dislocation signal outputted from the dislocation detecting portion 201 changes as illustrated in FIG. 8 (*d*) over the specific interval over which the instruction value change signal is outputted.

The first-order difference values in the dislocation signal that changes in this way change as illustrated in FIG. 8 (*e*). The changes in the first-order difference values for the dislocation signal are values that are larger corresponding to large changes in the control instruction values, but over the specific interval from the time t, the operations of the first state quantity calculating portion 202 and the second state quantity calculating portion 203 are stopped, so the calculation of the state quantities is stopped. In other words, the large values for the first-order difference values for the dislocation signal that would be diagnosed as a stick-slip are eliminated from the calculating operations. Consequently, for the specific period of time over which the instruction value change signal is outputted from the operation controlling portion 773, the stick-slip evaluation in the diagnosing portion 200 is stopped, thereby making it possible to prevent incorrect stick-slip evaluations.

Note that the aforementioned specific period of time may be determined as follows. First the time constant of the movable portion that is the subject of detection is defined as TC, the maximum magnitude of change of the control instruction value that can be produced for the dislocation is defined as D, and the standard deviation for the error in the dislocation detecting portion 201 is defined as $\sigma$. When, at time t=0 the control instruction value is updated from A1 to A1+D, then the dislocation measurement value at time t will be (A1+D)−D exp(−t/TC), and the difference from the control instruction value (A1+D) that is the target dislocation will be |D exp(−t/TC)|. The specific times should be until this difference is less than about $3\sigma$ (three times the standard deviation of the error of the dislocation detecting portion 201). Solving the inequality |D exp(−t/TC)|<$3\sigma$ results in t>TC ln(D/$3\sigma$), and thus the specific time interval should be set so as to be longer than TC ln(D/$3\sigma$). Note that when this time is longer than necessary, this will eliminate, from being subject to detection, an interval over which it would actually be possible to detect the stick-slip, and thus caution is needed.

Figure 9:
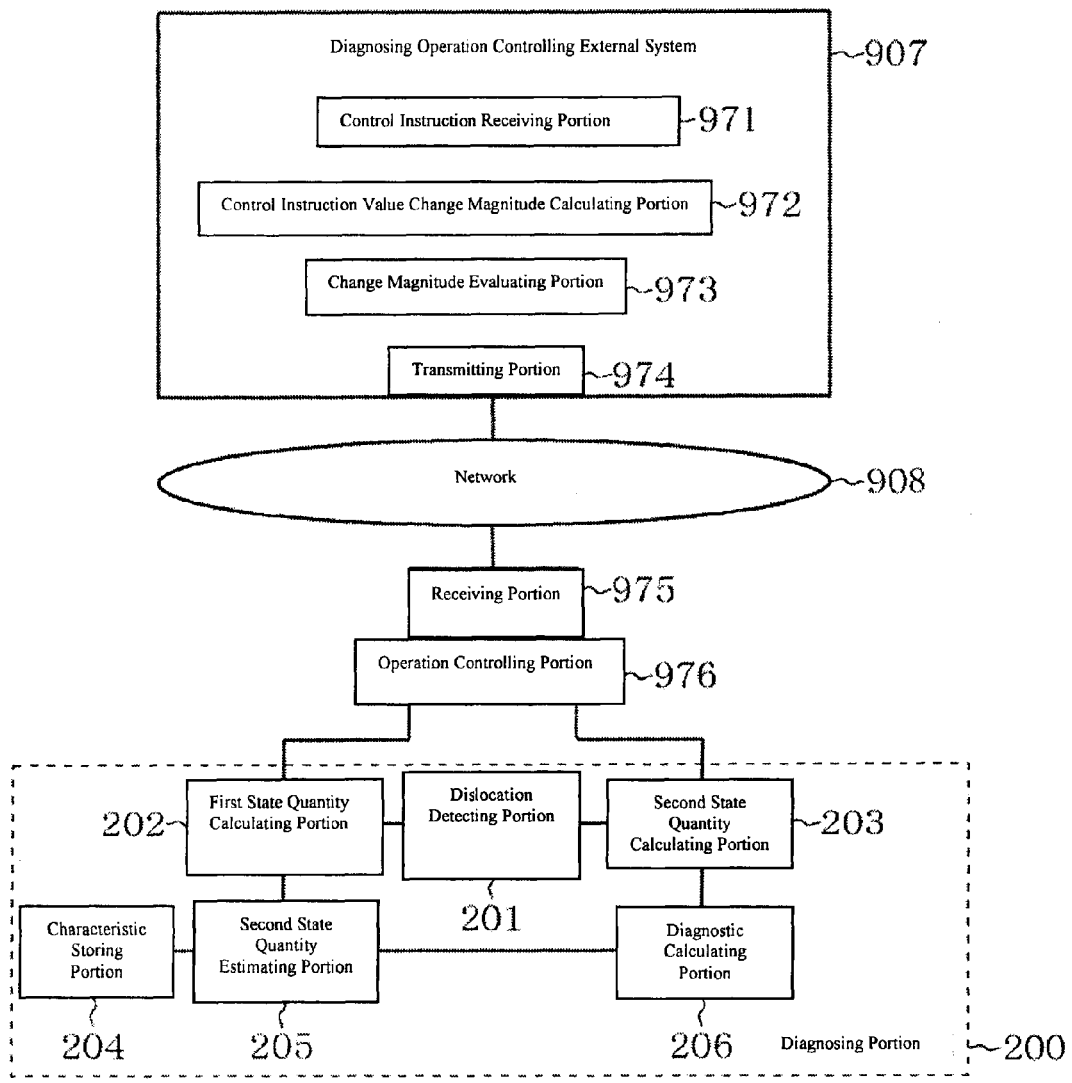
FIG. 9 is a structural diagram illustrating the structure of a stick-slip detecting device as set forth in another example according to the present invention.

FIG. 9 will be used to explain another example according to the present invention. FIG. 9 is a structural diagram illustrating the structure of a stick-slip detecting device as set forth according to the present invention. This stick-slip detecting device is provided with a diagnosing portion 200 for diagnosing a malfunction in a movable portion that has a contact sliding portion. The diagnosing portion 200 is identical to that in the second and seventh forms of embodiment, described above.

Additionally, the stick-slip detecting device as set forth is provided with a diagnosing operation controlling external system 907 for transmitting evaluation signals for stopping the operation of the diagnosing portion 200 based on a control instruction value for controlling the dislocation of the movable portion, and an operation controlling portion 976 for stopping the operation of the diagnosing portion 200 based on the evaluation signal sent by the diagnosing operation controlling external system 907. The evaluation signal sent from the diagnosing operation controlling external system 907 is received by a receiving portion 975 that is connected through a network 908, and sent to the operation controlling portion 976.

In the present example, the diagnosing operation controlling external system 907 is provided with a control instruction value receiving portion 971, a control instruction value change magnitude calculating portion 972, a change magnitude evaluating portion 973, and a transmitting portion 974. Note that the diagnosing operation controlling external system 907 is preferably within the same system as an external controlling system that determines the control instruction value for controlling the dislocation of the movable portion, but might also be achieved through a separate system.

The control instruction value receiving portion 971 receives the control instruction value for the positioner of, for example, a regulator valve that is the subject of the diagnosis by the diagnosing portion 200. When the diagnosing operation controlling external system 907 is within the same system as the external controlling system that determines the control instruction value for controlling the dislocation of the movable portion, then the acquisition of the control instruction value may be achieved through passing data within the system. If embodied in a separate system, then it is necessary to receive the control instruction value in real time by performing communications with, for example, the external system that determines the control instruction value for controlling the dislocation of the movable portion. The control instruction value change magnitude calculating portion 972 calculates the magnitude of the change, per unit time that is set in advance, based on the change in the control instruction value received by the operation controlling portion 976. If the magnitude of change calculated by the control instruction value change magnitude calculating portion 972 exceeds the reference value that has been set, then the change magnitude evaluating portion 972 outputs an operation stop signal. The transmitting portion 974 sends the operation stop signal that has been outputted from the change magnitude evaluating portion 973 to the receiving portion 975 through the network 908.

The receiving portion 975 receives the operation stop signal sent from the transmitting portion 974, and outputs it to the operation controlling portion 976. The operation controlling portion 976, which has received the operation stop signal, stops the evaluating operation of the diagnosing portion 200 by stopping the operation of the first state quantity calculating portion 202 and the second state quantity calculating portion 203. As a result, the stick-slip evaluation is stopped in the diagnosing portion 200, in the same manner as in the example described above, making it possible to prevent an incorrect stick-slip evaluation caused by the control instruction value to the movable portion, as described above.

Figure 10:
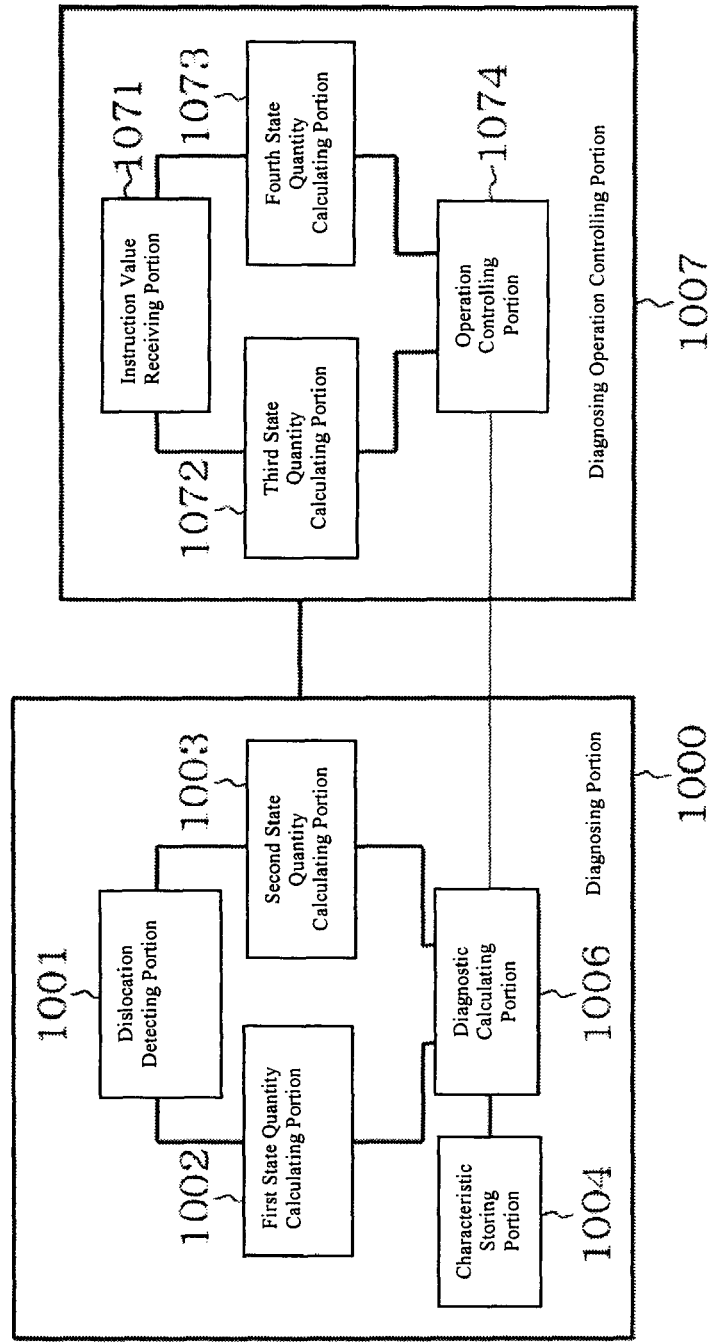
FIG. 10 is a structural diagram illustrating the structure of a stick-slip detecting device as set forth in a further example according to the present invention.

FIG. 10 will be used to explain another example according to the present invention. FIG. 10 is a structural diagram illustrating the structure of a stick-slip detecting device as set forth according to the present invention. This stick-slip detecting device is provided with a diagnosing portion 1000 for evaluating a malfunction in a movable portion that has a contact sliding portion, and a diagnosing operation controlling portion 1007 for stopping the operation of the diagnosing portion 1000 based on a control instruction value for controlling the dislocation of the movable portion. The diagnosing portion 1000 is provided with a dislocation detecting portion 1001, a first state quantity calculating portion 1002 (first calculating means), a second state quantity calculating portion 1003 (second calculating means), a characteristic storing portion 1004, and a diagnostic calculating portion 1006.

The dislocation detecting portion 1001 detects (measures) the dislocation of a movable portion of a valve unit, or the like, and outputs a dislocation signal that is, for example, a digital signal.

The first state quantity calculating portion 1002 calculates a mean square of first-order difference values as a first state quantity from dislocation signals outputted from the dislocation detecting portion 1001 as the measured values that indicate the dislocations detected for the movable portion. Additionally, the second state quantity calculating portion 1003 calculates the mean square of second-order difference values as the second state quantity from the dislocation signals outputted from the dislocation detecting portion 1001.

The characteristic storing portion 1004 stores the relationship between the first state quantity and the second state quantity obtained from the dislocations at the time of proper operation of the movable portion, calculated in advance. For example, the characteristic storing portion 1004 stores, as the relationship (characteristic formula) between the mean square of the first-order difference values and the mean square of the second-order difference values of the dislocation signal when the sliding operation of the movable portion is in the properly operating state, a linear approximation characteristic formula using two constants A and B.

The diagnostic calculating portion 1006 calculates the relationship between the first state quantity, calculated by the first state quantity calculating portion 1002, and the second state quantity, calculated by the second state quantity calculating portion 1003, and compares that calculated relationship to a relationship stored in the characteristic storing portion 1004, to detect the occurrence of stick-slip. For example, the diagnostic calculating portion 1006 calculates the difference between the ratio of the mean square of the first-order difference values, calculated by the first state quantity calculating portion 1002, and the mean square of the second-order difference values, calculated by the second state quantity calculating portion 1003, from the ratio of the two state quantities at a time of proper operation, stored in the characteristic storing portion 1004, and if the calculated difference is greater than a specific value, concludes that there has been an occurrence of stick-slip.

The structure set forth above is identical to that in the sixth form of embodiment, described previously.

In the present form as described above, during the evaluation of the stick-slip (a malfunction in the movable portion) by the diagnosing portion 1000, in the present form of embodiment the diagnosing operation controlling portion 1007 stops the evaluating operation of the diagnosing portion 1000 by stopping the operation of diagnostic calculating portion 1006 based on a control instruction value to the movable portion.

The diagnosing operation controlling portion 1007 will be described in greater detail below. The diagnosing operation controlling portion 1007 comprises an instruction value receiving portion 1071, a third state quantity calculating portion (third calculating means) 1072, a fourth state quantity calculating portion (fourth calculating means) 1073, and an operation controlling portion 1074.

The instruction value receiving portion 1071 receives a dislocation instruction value (control instruction value) for the positioner of, for example, a regulator valve that is the subject of the diagnosing by the diagnosing portion 1000.

The third state quantity calculating portion 1072 calculates the mean square of the first-order difference values, as the third state quantity, from the control instruction value received by the instruction value receiving portion 1071. This is an identical operation to that of the first state quantity calculating portion 1002 that calculates the mean square of the first-order difference values, as the first state quantity, from the dislocation signal that has been measured.

Moreover, the fourth state quantity calculating portion 1073 calculates the mean square of the second-order difference values, as the fourth state quantity, from the control instruction value received by the instruction value receiving portion 1071. This is an identical operation to that of the second state quantity calculating portion 1003 that calculates the mean square of the second-order difference values, as the second state quantity, from the dislocation signal that has been measured.

The operation controlling portion 1074 detects a second ratio that indicates the ratio of the fourth state quantity to the third state quantity exceeding a first ratio that indicates the ratio of the second state quantity to the first state quantity, and stops the evaluating operation of the diagnosing portion 1000. In the present form, the operation controlling portion 1074 stops the evaluating operation of the diagnosing portion 1000 by stopping the operation of the diagnostic calculating portion 1006.

Figure 11A:
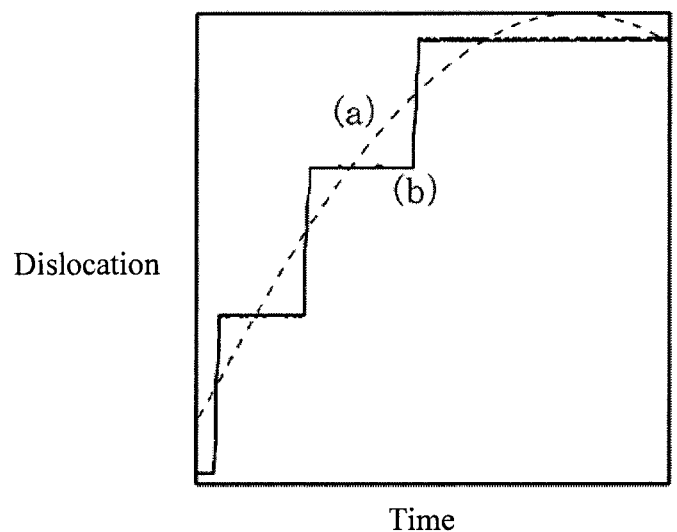
FIG. 11A is a diagram illustrating the relationship between the control instruction values and the dislocation signals obtained.

First let us consider the case wherein the control instruction values for the dislocation as illustrated by the dotted line (a) in FIG. 11A are applied. If the movable portion operates properly for these control instruction values, then the dislocation signal that is measured and outputted by the dislocation detecting portion 1001 will also be in the same state, and the diagnosing portion 1000 will not conclude that a stick-slip has occurred. Additionally, if the third state quantity and the fourth state quantity are calculated based on the control instruction values in this way, then the first ratio that indicates the ratio of the second state quantity to the first state quantity will be larger than the second ratio that indicates the ratio of the fourth state quantity to the third state quantity.

On the other hand, when a stick-slip has occurred, then the dislocation signal that is measured and outputted by the dislocation detecting portion 1001 will have a stair-step shape as indicated by the solid line (b) in FIG. 11A. When this type of dislocation signal is detected, then the diagnosing portion 1000 will conclude that a stick-slip has occurred. Even in this case, the first ratio that indicates the ratio of the second state quantity to the first state quantity will be larger than the second ratio that indicates the ratio of the fourth state quantity to the third state quantity.

Figure 11B:
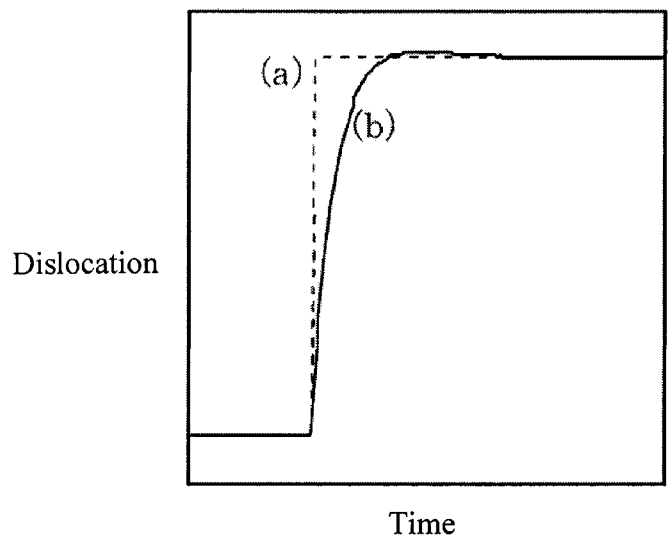
FIG. 11B is a diagram illustrating the relationship between the control instruction values and the dislocation signals obtained.
Figure 12:
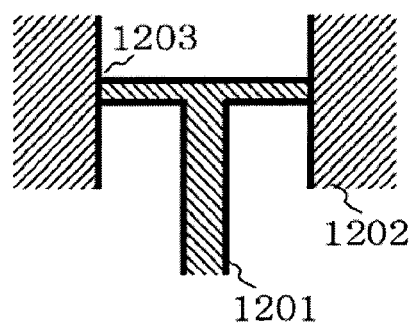
FIG. 12 is a structural diagram illustrating the structure of a device having a sliding part.
Figure 13A:
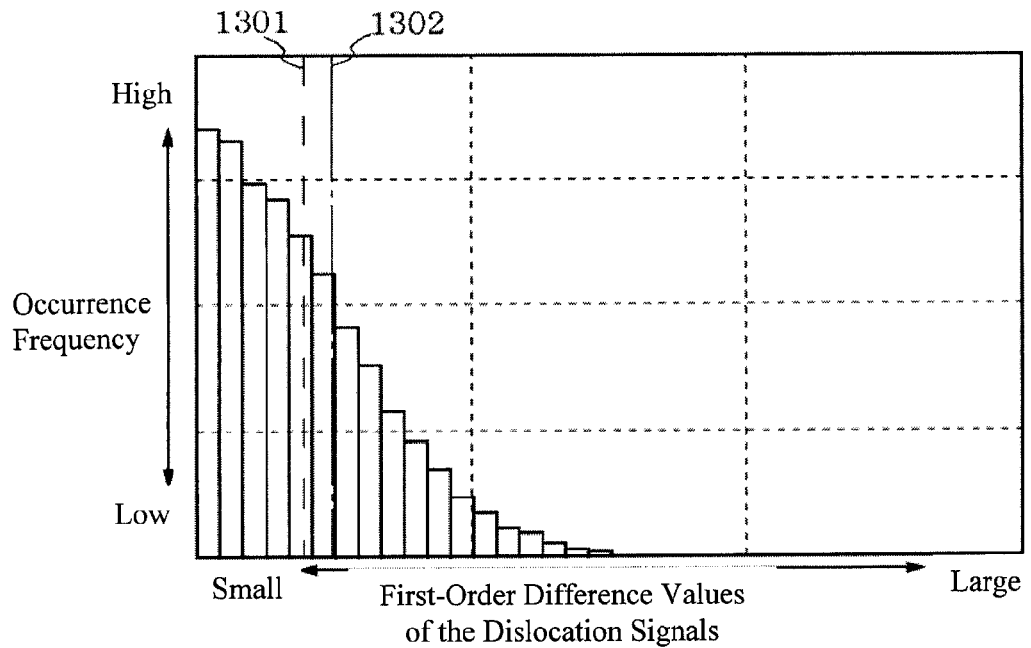
FIG. 13A is a histogram illustrating the distribution of the frequency of occurrences of first-order difference values in a dislocation signal obtained from a part that undergoes reciprocating sliding.
Figure 13B:
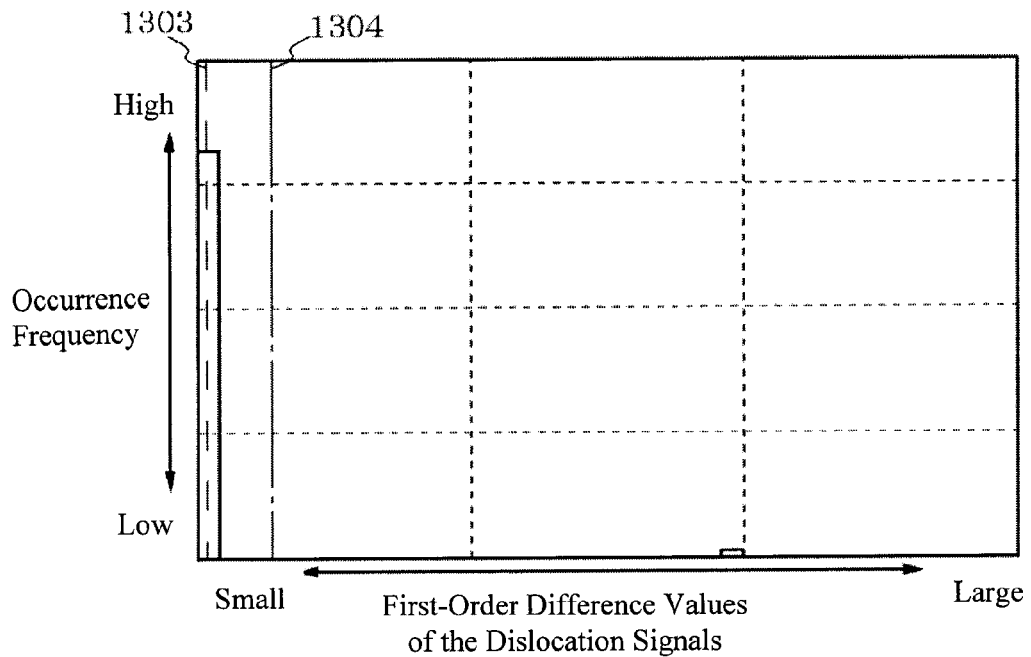
FIG. 13B is a histogram illustrating the distribution of the frequency of occurrences of first-order difference values in a dislocation signal obtained from a part that undergoes reciprocating sliding.
Figure 14:
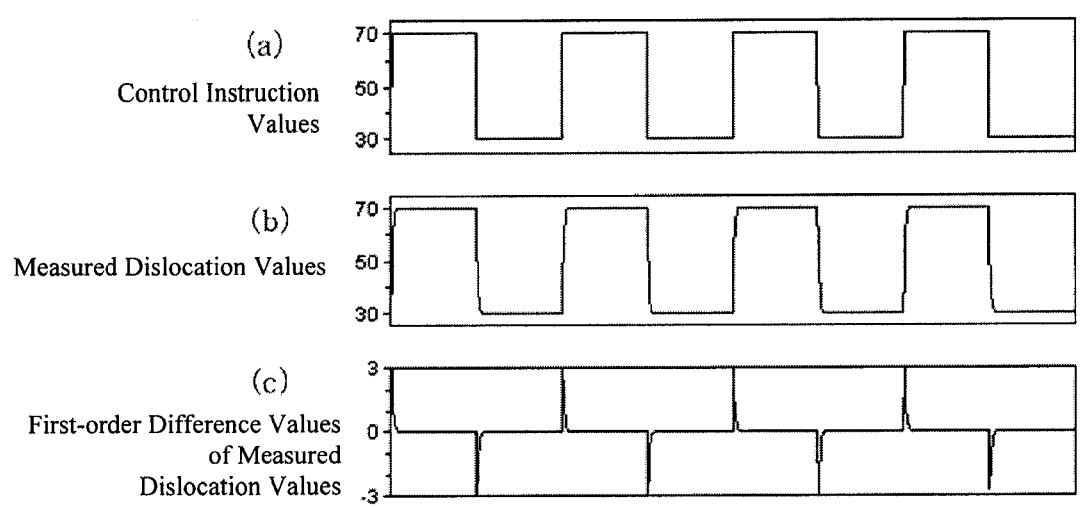
FIG. 14 is a timing chart illustrating the changes in the control instruction values, the dislocation measurement values, and the first-order difference values of the dislocation measurement values.

In contrast to the case set forth above, let us consider a case wherein a control instruction signal for a dislocation indicated by the dotted line of (a) in FIG. 11B is applied. When control instruction values of this type are applied, then even if the movable portion is operating properly, the dislocation signal measured and outputted from the dislocation detecting portion 1001 will appear as shown by the solid line (b) in FIG. 11B. In such a state, the diagnosing portion 1000 will conclude that a stick-slip has occurred. If at this point the third state quantity and the fourth state quantity are calculated based on the control instruction values of (a), then the second ratio that indicates the ratio of the fourth state quantity to the third state quantity will be larger than the first ratio that indicates the ratio of the second state quantity to the first state quantity.

Consequently, if it is detected that the "fourth state quantity divided by the third state quantity" is greater than the "second state quantity divided by the first state quantity," then an incorrect stick-slip evaluation can be prevented by stopping the evaluating operation of the diagnosing portion 1000.

As described above, the present form has the distinctive feature of calculating a third state quantity from the control instruction values, calculating a fourth state quantity from the control instruction values, and stopping the evaluating operation when it has been detected that a first ratio that indicates the ratio of the second state quantity to the first state quantity exceeds a second ratio that indicates the ratio of the fourth state quantity to the third state quantity. Doing so makes it possible to prevent an incorrect stick-slip evaluation that would be caused by the control instruction values for the movable portion, as described previously, by stopping the stick-slip evaluation in the diagnosing portion 1000.

Note that while mean squares of the first-order difference values were calculated for the first state quantity and the second state quantity and mean squares of second-order difference values were calculated as the second state quantity and the fourth state quantity, there is no limitation thereto. Instead average values for absolute values of first-order difference values may be calculated as the first state quantity and the third state quantity, and root mean squares of first-order difference values may be calculated as the second state quantity and the fourth state quantity.

Note that the stick-slip detection set forth above may detect the stick-slip through processing the detected dislocations using a computer. For example, a CPU that structures a computer may be operated through a program that is deployed in a memory that is connected through a bus, to process the dislocation signal that is obtained to output diagnosis results, and the processing that produces the diagnosis results may be stopped by the obtained control instruction values. Here the aforementioned program may run, on a CPU (a computer), the process for the stick-slip detection explained in any of the forms of embodiment described above. Furthermore, the program that is deployed in memory may be stored on an external memory device that is connected externally through a bus and then deployed. The external storage device may be, for example, a magnetic disk storage device.

Note that the present invention is not limited to the examples set forth above, but rather many alternate forms of embodiment are possible by individuals skilled in the art in the present field, within the technical concept of the present invention.

The invention claimed is:

1. A stick-slip detecting device for a movable portion of a valve or gas governor, comprising:
   a diagnosing device evaluating a malfunction of the movable portion, comprising:
      a dislocation detector measuring a physical dislocation of the movable portion having a contact sliding portion;
      a first calculator calculating a first state quantity from the physical dislocation;
      a second calculator calculating a second state quantity from the physical dislocation;
      a characteristic storing portion storing a relationship, as a reference value, between the first state quantity and the second state quantity, obtained from the physical dislocation at a time of proper operation of the movable portion, calculated in advance;
      a state quantity estimator calculating an estimated state quantity by using the relationship that is stored in the characteristic storing portion to estimate the second state quantity from the first state quantity that was calculated by the first calculator; and
      a diagnostic calculator evaluating a malfunction in the movable portion by comparing the second state quantity, calculated by the second calculator, to the estimated state quantity; and
   a diagnosing operation controlling portion stopping the evaluating operation of the diagnosing portion based on a control instruction value controlling the physical dislocation of the movable portion, wherein
   the diagnosing operation controlling portion comprises:
      a third calculator calculating a third state quantity from the control instruction value;
      a fourth calculator calculating a fourth state quantity from the control instruction value; and
      an operation controller detecting that a second ratio that indicates a ratio of the fourth state quantity to the third state quantity exceeds a first ratio that indicates a ratio of the second state quantity to the first state quantity, and stopping the evaluation operation of the diagnosing portion,
   wherein the first state quantity is a magnitude of a small change in the physical dislocation;
   wherein the second state quantity is a magnitude of a small change in the magnitude of the small change in the physical dislocation;
   wherein the movable portion is a piston;
   wherein the contact sliding portion is an interior surface of a chamber that houses the piston;
   wherein the third state quantity is a magnitude of a small change in the control instruction value; and
   wherein the fourth state quantity is a magnitude of a small change in the magnitude of the small change in the control instruction value.

2. A stick-slip detecting device as set forth in claim 1, wherein:
   the diagnosing operation controlling portion stops the evaluation operation of the diagnosing portion by stopping the operation of the first calculator and the second calculator based on a control instruction value.

3. A stick-slip detecting device as set forth in claim 1, wherein:
   the diagnosing operation controlling portion stops the evaluation operation of the diagnosing portion by stopping the operation of the diagnostic calculator based on the control instruction value.

4. A stick-slip detecting device as set forth in claim 1, wherein:
   the diagnosing operation controlling portion comprises:
      a change magnitude calculator calculating the magnitude of a change in the control instruction value; and
      an operation controller detecting that the change magnitude calculated by the change magnitude calculator exceeds a threshold value that is set in advance, and stopping the evaluation operation of the diagnosing portion.

5. A stick-slip detecting device as set forth in claim 1 wherein:
   the first state quantity is an average of absolute values of the first-order difference values of the dislocation; and
   the second state quantity is the root mean square of the first-order difference values of the dislocation.

6. A stick-slip detecting device as set forth in claim 1 wherein:
   the first calculator comprise:
      a difference calculator calculating first-order difference values of the dislocations detected by the dislocation detector;
      a first sum calculator summing the absolute values of the first-order difference values obtained from the difference calculator; and
      a first average calculator calculating the first state quantity through averaging some or all of the sums of the first-order difference values obtained from the first sum calculator; and wherein:
   the second calculator comprise:
      a second sum calculator summing the squares of the first-order difference values obtained from the difference calculator; and
      a second average calculator calculating the second state quantity through averaging some or all of the squares of the first-order difference values obtained from the second sum calculator.

7. A stick-slip detecting device for a movable portion of a valve or gas governor, comprising:
   a diagnosing device evaluating a malfunction of the movable portion comprising:
      a dislocation detector measuring a physical dislocation of the movable portion having a contact sliding portion;
      a first calculator calculating a first state quantity from the physical dislocation;
      a second calculator calculating a second state quantity from the physical dislocation;
      a characteristic storing portion storing a relationship between the first state quantity and the second state quantity, obtained from the physical dislocation at a time of proper operation of the movable portion, calculated in advance; and a diagnostic calculator evaluating a malfunction in the movable portion by comparing the relationship between the first state quantity, calculated by the first state quantity calculating portion, and the second state quantity, calculated by the second state quantity calculating portion, to the relationship stored in the characteristic storing portion; and a diagnosing operation controlling portion stopping the evaluating operation of the diagnosing portion based on a control instruction value controlling the physical dislocation of the movable portion, wherein the diagnosing operation controlling portion comprises:
  a third calculator calculating a third state quantity from the control instruction value;
  a fourth calculator calculating a fourth state quantity from the control instruction value; and
  an operation controller detecting that a second ratio that indicates a ratio of the fourth state quantity to the third state quantity exceeds a first ratio that indicates a ratio of the second state quantity to the first state quantity, and stopping the evaluation operation of the diagnosing portion, wherein the first state quantity is a magnitude of a small change in the physical dislocation;

wherein the second state quantity is a magnitude of a small change in the magnitude of the small change in the physical dislocation;

wherein the movable portion is a piston;

wherein the contact sliding portion is an interior surface of a chamber that houses the piston;

wherein the third state quantity is a magnitude of a small change in the control instruction value; and wherein the fourth state quantity is a magnitude of a small change in the magnitude of the small change in the control instruction value.

* * * * *